US006943463B2

(12) United States Patent
Goerke et al.

(10) Patent No.: US 6,943,463 B2
(45) Date of Patent: Sep. 13, 2005

(54) SYSTEM AND METHOD OF TESTING CONNECTIVITY BETWEEN A MAIN POWER SUPPLY AND A STANDBY POWER SUPPLY

(75) Inventors: Ulrich B. Goerke, Boylston, MA (US); Phillip J. Roux, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 597 days.

(21) Appl. No.: 10/215,394

(22) Filed: Aug. 8, 2002

(65) Prior Publication Data
US 2004/0027751 A1 Feb. 12, 2004

(51) Int. Cl.[7] ................................ H02J 9/04
(52) U.S. Cl. ..................... 307/66; 307/66; 340/333
(58) Field of Search ............. 307/66; 429/61; 324/771; 320/122; 340/333

(56) References Cited

U.S. PATENT DOCUMENTS

| | | |
|---|---|---|
| 5,107,532 A | 4/1992 | Hansen et al. |
| 5,448,675 A | 9/1995 | Leone et al. |
| 5,679,987 A | 10/1997 | Ogawa |
| 5,841,997 A | 11/1998 | Bleiweiss et al. |
| 5,890,214 A | 3/1999 | Espy et al. |
| 5,901,151 A | 5/1999 | Bleiweiss et al. |
| 5,945,746 A * | 8/1999 | Tracewell et al. ............ 307/43 |
| 6,236,226 B1 * | 5/2001 | Hagiwara .................. 324/771 |
| 6,421,711 B1 | 7/2002 | Blumenau et al. |
| 6,425,049 B1 | 7/2002 | Yamamoto et al. |
| 6,601,181 B1 * | 7/2003 | Thomas .................... 713/340 |
| 2002/0044562 A1 | 4/2002 | Killen, Jr. et al. |
| 2002/0046276 A1 | 4/2002 | Coffey et al. |

\* cited by examiner

Primary Examiner—Brian Sircus
Assistant Examiner—Daniel Cavallari
(74) Attorney, Agent, or Firm—Guerin & Rodriguez, LLP; Michael A. Rodriguez

(57) ABSTRACT

Described are a system and method of testing connectivity between a main power supply and a standby power supply. The system includes a processor, a main power supply, and a standby power supply. The processor issues a command to the standby power supply to provide dc power to main power supply. The standby power supply switches from providing ac power to providing dc power to the main power supply in response to the command. The main power supply, in response to receiving dc power from the standby power supply, provides a communication that operates to indicate to the processor that the main power supply is receiving dc power from the standby power supply in response to the command.

20 Claims, 5 Drawing Sheets

SYSTEM AND METHOD OF TESTING CONNECTIVITY BETWEEN A MAIN POWER SUPPLY AND A STANDBY POWER SUPPLY

FIELD OF THE INVENTION

The invention relates generally to systems with main power supplies and backup power supplies. More particularly, the invention relates to a system and method of testing connectivity between a power supply and its backup power supply.

BACKGROUND

The technical community has long recognized the importance of supporting a main power supply with a backup or standby power supply for those systems, such as computer systems and data storage systems, which can ill afford the loss of data and system down-time. If the utility power (i.e., ac-line) fails, the backup power supply operates to ensure that the system still has power. Some systems have a plurality of enclosures. In general, each enclosure of a system houses electronic components that perform a particular function. Each enclosure can have its own main power supply, and some systems, such as those that support redundancy, can have enclosures with a plurality of main power supplies. Each main power supply can require a separate backup power supply.

Accordingly, the assembly of such systems can be complex because of the many wires, cables, and power cords needed to interconnect properly the various enclosures. Failure to connect a backup power system correctly to the main power supply could result in a catastrophic loss of data should the utility power fail and the backup power supply not be connected to provide backup power. Thus, the technical community has devised various tests to verify whether the backup power supply will be available in the event of an ac-line failure.

Many tests, however, provide a false sense of security because the tests focus on verifying whether the backup power supply is operational, and not whether the backup power supply is actually connected to the main power supply. For instance, a system assembler may believe that a backup power supply is connected to a first main power supply, but is in fact connected to a second main power supply. A test of the functionality of the backup power supply determines that the backup supply is functioning properly, i.e., able to deliver the necessary power if required. The backup power supply may even respond properly to commands and queries. But such tests, while proving functionality, do not prove connectivity to the main power supply that needs the backup power. An assembler may deliver this system to a customer believing the system is operational, but in this case, if the first power supply fails because the utility line fails, the backup power supply will not supply the necessary power to the appropriate main power supply. Thus there remains a need for a system and method that can conclusively test the connectivity between a backup power supply and its corresponding main power supply.

SUMMARY

In one aspect, the invention features a system having a processor, a first power supply in communication with the processor, and a second power supply that supplies ac power to the first power supply. The second power supply switches from providing ac power to providing dc power to the first power supply in response to a command issued by the processor. The first power supply, in response to a loss of ac power from the second power supply, provides a communication that operates to indicate to the processor that the second power supply is electrically connected to the first power supply for supplying power.

In another aspect, the invention features a method of testing connectivity between a main power supply and a standby power supply. A command is provided from a processor that instructs the standby power supply to switch from supplying ac power to supplying dc power to the main power supply. DC power is supplied to the main power supply from the standby power supply in response to the command from the processor. The main power supply generates, in response to a loss of ac power, a communication that operates to indicate to the processor that the standby power supply is electrically connected to the main power supply for supplying power.

In yet another aspect, the invention features a system having processing means for issuing a command. A first power source is in electrical communication with the processing means, and a backup power source provides ac power to the first power source. The backup power source switches from providing ac power to providing dc power to the first power source in response to the command from the processing means. The system also includes means for communicating to the processing means that the first power source is operating on dc power in response to the backup power supply switching from providing ac power to providing dc power.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Systems that employ backup power supplies do so generally because such systems process crucial information that cannot be lost or the availability of such systems is critical for the operations of a business or organization. For such systems, it is important that the standby power supply actually be connected to the main power supply to provide the necessary power in the event that utility power is lost.

The invention features a system and method of testing the connection between a main power supply and its standby power supply. Although the following description uses a storage system to illustrate the principles of the invention, it is to be understood that these principles also apply to other types of systems that backup a main power supply with a standby power supply.

Figure 1:
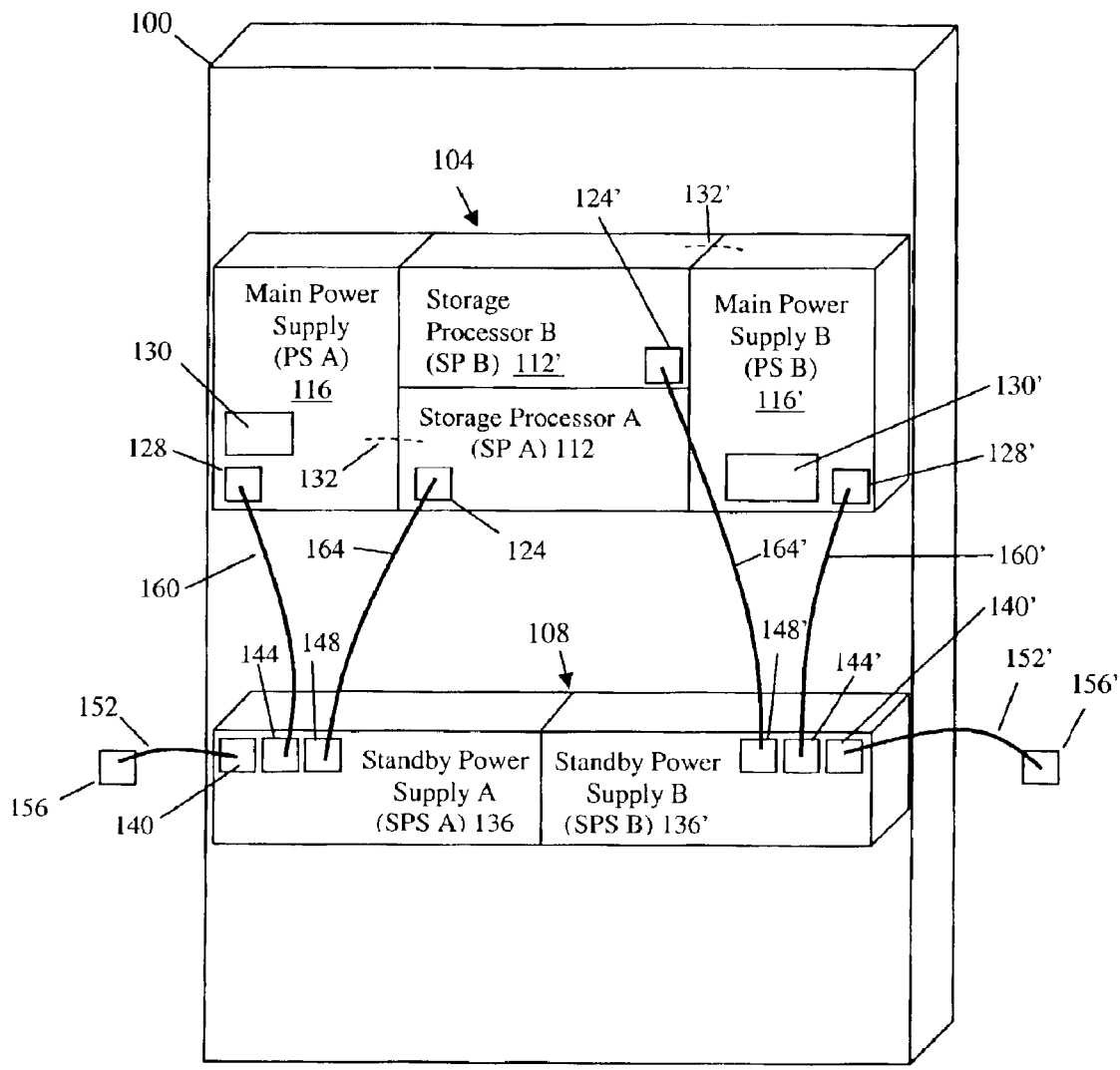
FIG. 1 is a diagram of an embodiment of a data storage system embodying the principles of the invention.

FIG. 1 shows a rear view of an embodiment of a data storage system 100 constructed in accordance with the principles of the invention. The data storage system 100 includes enclosures 104 and 108. The enclosure 104, called a processor or host enclosure, has redundant storage or host processors (SP A) 112 and (SP B) 112' and redundant main power supplies (PS A) 116 and (PS B) 116'. The enclosure 108, called a standby power supply enclosure, has redundant standby power supplies (SPSs): a first standby power supply (SPS A) 136 and a second standby power supply (SPS B) 136'. As indicated by the parenthetical descriptions, the enclosures 104, 108 have an "A" side and a "B" side. Although herein illustrated by an embodiment that uses redundant power supplies and storage processors, it is to be understood that the principles of the invention apply to systems that do not employ redundancy (i.e., have a single main power supply and a single standby power supply).

Each storage processor 112, 112' (generally, storage processor 112) includes a communications port 124, 124', respectively. Each main power supply 116, 116' includes a power inlet 128, 128', respectively, and is capable of operating from either an ac or a dc source. Each main power supply 116, 116' also includes a detection circuit 130, 130', respectively, for detecting when the source of power changes from ac power to dc power. In one embodiment, each detection circuit 130, 130' detects the power source change upon detecting the loss of ac power. Each detection circuit 130, 130' provides a logic high signal while ac power is present and provides a logic low signal when that circuit 130, 130' no longer detects ac power. In another embodiment, the detection circuit 130, 130' detects the power source change upon detecting the presence of dc power. Circuits for detecting the loss of ac power and for detecting the presence of dc power are known in the art.

The main power supply 116 is also connected to the storage processor 112 through the backplane (or mid-plane) by one or more electrical connection(s) 132, and the main power supply 116' is connected to the storage processor 112' through the backplane by one or more electrical connection (s) 132'.

In the standby power enclosure 108, the standby power supply 136 on the "A" side is associated with the main power supply 116 and with the storage processor 112. Similarly, the standby power supply 136' on the "B" side is associated with the main power supply 116' and with the storage processor 112'. Each standby power supply 136, 136' can deliver ac power or dc power to the associated power supply 116, 116'. In one embodiment, each standby power supply 136, 136' also supports a half-duplex, RS232 interface and protocol. Other interface standards and protocols can be used without departing from the principles of the invention.

The first standby power supply 136 includes an ac inlet (or input connector) 140, an outlet (or output connector) 144, and a communication port 148 at the rear of the enclosure 108. A first power cord 152 electrically connects the ac inlet 140 to an ac power source 156 (e.g., utility line). A second power cord 160 electrically connects the outlet 144 of the first standby power supply 136 to the inlet 128 of the main power supply 116. A data communication cable 164 connects the communication port 148 of the first standby power supply with the communication port 124 of the storage processor 112. In one embodiment, the storage processor 112 and the first standby power supply 136 communicate over the communication cable 164 according to the RS-232 protocol.

The second standby power supply 136' is connected to the storage processor 112' and main power supply 116' of the processor enclosure 104 similarly to the first standby power supply 136, with like reference numerals indicating like structural elements and features.

Operation is described with respect to the "A" side of the enclosures 104 and 108 with the understanding that the "B" side operates similarly. Under normal operation (i.e., on utility ac power or "on-line"), the standby power supply 136 provides an ac-line input sinusoidal voltage to the main power supply 116 over the power cord 160. The voltage is a straight pass-through of the ac-line 156 from the inlet 140 to the outlet 144. The default state of the standby power supply 136 is "on-line" (ac-line pass through) operation.

In the event of an ac-line failure, or upon receiving a certain command or request from the storage processor 112 by way of communication cable 164 (described in more detail below), the standby power supply 136 transfers from "on-line" to "on-battery" mode. In the on-battery mode, the standby power supply 136 powers the processor enclosure 104. While "on-battery", the standby power supply 136 provides a dc voltage (e.g., approximately 200V) to the main power supply 116 by the power cord 160.

The main power supply 116 sends an output signal to the storage processor 112 upon the occurrence of either or both of two conditions. The first condition is detecting the loss of ac input power, that is, the ac input power is no longer available at the inlet 128 of the main power supply 116. The second condition is detecting that the voltage available to the main power supply 116 is a dc voltage. In one embodiment, the output signal, called hereafter the AC_FAIL_N signal, is an active low signal (i.e., asserted to a low state upon detection of either or both of the conditions described above). This signal is considered a power status indicator and not an indicator of an impending loss of ac power. This signal is driven or deasserted to a high state when ac power is present or restored. As used herein, an asserted signal means that the signal is logically TRUE and a deasserted signal means that the signal is logically FALSE. Thus, in this embodiment, the AC_FAIL_N signal is defined as TRUE when asserted low.

The main power supply 116 also sends a second output signal to the storage processor 112 when the main power supply 116 is without power (i.e., no ac power and no dc power) although plugged into the system 100. In one embodiment, the second output signal, called hereafter the PS_FLT_N signal, is an active low signal (i.e., asserted to a low state upon detection of the above condition), that is, the PS_FLT_N signal is defined as TRUE when asserted low. The PS_FLT_N signal is deasserted (i.e., in a logic high state) when the main power supply 116 is functioning normally.

If the storage processor 112 receives from the main power supply 116 an asserted AC_FAIL_N signal (i.e., AC_FAIL_N is logically TRUE) and a deasserted PS_FLT_N signal (i.e., PS_FLT_N is logically FALSE), this indicates that the main power supply 116 is running from a dc source (i.e., the standby power supply). If the AC_FAIL_N and PS_FLT_N signals are both asserted (i.e., TRUE), the storage processor 112 determines that the main power supply 116 is not receiving any power through the standby power supply 136. If neither of the AC_FAIL_N and PS_FLT_N signals is asserted, this indicates that the main power supply 116 is receiving ac power from the ac line 156, presumably, but not necessarily, through the standby power supply 136. The source of the ac power is confirmed upon a successful testing of the connectivity between the standby power supply 136 and the main power supply 116.

The storage processor 112 obtains other information that can be used to ascertain the meaning of the signals received from the main power supply 116. The storage processor 112 acquires such information by communicating with the standby power supply 136 via cable 164. In general, the storage processor 112 and the standby power supply 136 communicate on a command-response basis. The storage processor 112 sends commands to the standby power supply 136 that request status information or instruct the standby power supply 136 to perform certain operations. In general, a command is an instruction or communication that causes an action to be carried out. The standby power supply 136 then responds to commands received from the storage processor 112 as appropriate. For example, as described above, the storage processor 112 issues a certain command (hereafter called the "BATTEST" command), which causes the standby power supply 136 to disable the ac power and transfer to supplying dc power for actual-load operation. In one embodiment, the communication between the standby power supply 136 and the storage processor 112 follows the RS-232 protocol. Again, the communication between the standby power supply 136 and storage processor 112 can follow any protocol without departing from the principles of the invention.

The storage processor 112 also communicates with the standby power supply 136 through queries. A query serves to extract information. Queries differ from commands in that the standby power supply 136 responds to queries with information sought by the storage processor 112 and to commands with a terminator character that in effect serves to acknowledge the command. Through queries the storage processor 112 is able to determine whether the standby power supply 136 is operating properly. For example, the standby power supply 136 responds to a particular query by returning a "pass," "fail," or "testing" result to the storage processor 112. This query is useful for indicating whether the standby power supply 136 was able to provide a dc voltage in response to the BATTEST command. The standby power supply 136 may also send asynchronously "immediate status" information over the communication path 164 when a change in status has occurred; for example, the standby power supply 136 switches from on-line to on-battery mode.

Information obtained from the standby power supply 136 with the signal or signals received from the main power supply 116 provide the storage processor 112 with adequate information to determine the status of the main and standby power supplies 116, 136 and to verify the connectivity between the two supplies 116, 136, as described in more detail below.

The operation described above with respect to the "A" side of the main power supply 116, storage processor 112, the standby power supply 136 applies also to the main power supply 116' and storage processor 112' of the processor enclosure 104 and standby power supply 136' of the standby power supply enclosure 108.

Figure 2:
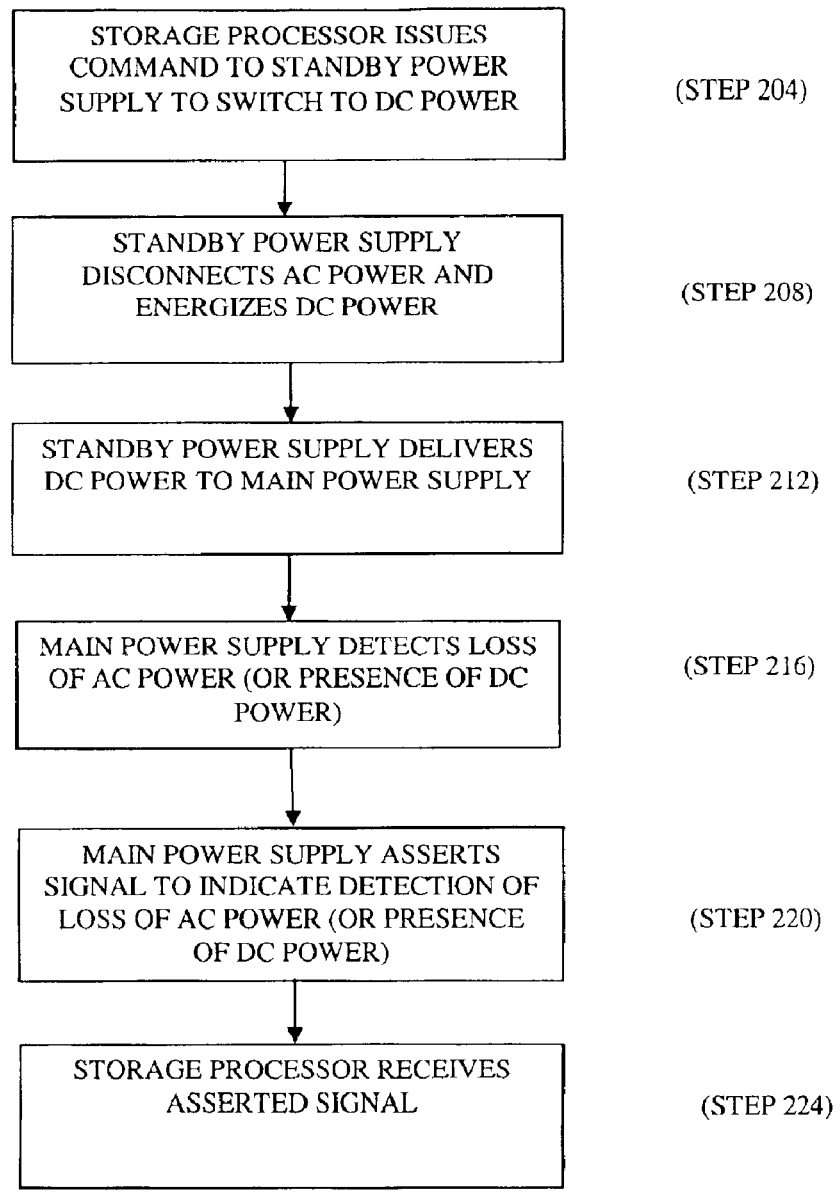
FIG. 2 is a flow diagram of an embodiment of a process for testing the connectivity between a standby power supply and a main power supply in the data storage system of FIG. 1.

FIG. 2 shows an embodiment of a process 200 for testing the connectivity between the standby power supplies 136, 136' and the respective main power supplies 116, 116'. The process 200 executes upon initial power-up of the data storage system 100 (FIG. 1) and, in some embodiments, at predetermined intervals thereafter. Other schedules for executing the process 200 can be practiced without departing from the principles of the invention.

In step 204, the storage processor 112 issues a command instructing the standby power supply 136 to perform a battery diagnostic test, which includes switching from supplying ac power to the main power supply 116 to supplying dc power. In response to the command, the standby power supply 136 disconnects from the ac power and energizes the dc power (step 208). A dc voltage then powers (step 212) the main power supply 116. The main power supply 116 detects (step 216) the loss of the ac power or the presence of dc power and, in response, asserts (step 220) an output signal (i.e., the AC_FAIL_N is TRUE).

The storage processor 112 that initiated the BATTEST command receives (step 224) the AC_FAIL_N signal over the electrical connection 132. Receipt of the AC_FAIL_N signal by the storage processor 112 completes a closed loop that originates and terminates with the storage processor 112, passes through the main and standby power supplies 116, 136, and includes connections 164, 160, and 132. The storage processor 112 uses this AC_FAIL_N signal and other signals received from the main power supply 116 (e.g., the PS_FLT_N signal) and information from the standby power supply 136 (e.g., as a result of queries) to determine that the main power supply 116 is receiving dc power in response to the BATTEST command sent to the standby power supply 136 from the storage processor 112. Because the main power supply 116 can receive dc power only if connectivity exists between the standby power supply 136 and the main power supply 116, the storage processor 112 can conclude from the AC_FAIL_N signal that the main power supply 116 is actually connected to the standby power supply 136, and therefore available in the event of a failure of the ac utility. Light-emitting diodes (LEDs) or other visual indicators positioned on the rear or front side of the processor enclosure 104 can illuminate when the storage processor 112 confirms the connection between the main power supply 116 and its standby power supply 136 as described.

In one embodiment, the storage processor 112 waits a predetermined period after sending the BATTEST command (e.g., a few seconds) for the assertion of the AC_FAIL_N signal to occur. If the assertion of the signal does not appear within the predetermined period, the storage processor 112 can signal a failure (e.g., trigger an audible or visible alarm) to alert an assembler of the system 100, or other user, of a missing or improper connection between the main and standby power supplies 116, 136. Also, in some embodiments, software executing on the storage processor 112 alters its program execution, logs an error message, and/or illuminates a "fault" LED as a result of the failure.

Testing the connection between the second main power supply 116' and second standby power supply 136' entails repeating steps 204 through 224 of the process 200 using the second storage processor 112'. In this instance, the closed loop of communication originates and terminates with the second storage processor 112', passes through the second main power supply 116' and second standby power supply 136', and includes connections 164', 160', and 132'.

This closed-loop technique for testing the connectivity of the main power supply 116 to the standby power supply 136 can also reveal other types of incorrect power supply connections. For example, consider an embodiment in which the standby power supply 136, by design, is not intended to power the main power supply 116 with dc power when the ac power is cutoff. If, during a BATTEST, the main power supply 116 asserts an AC_FAIL_N signal and not a PS_FLT_N signal (the main power supply 116 is operating properly), the storage processor 112 can determine that the main power supply 116 is receiving dc power from an unexpected source, suggesting an unintended connection between the main power supply 116 and the source of that dc power.

As another example, consider an embodiment in which the main power supply 116 asserts an AC_FAIL_N signal and not a PS_FLT_N signal (the main power supply 116 is operating properly), but the storage processor 112 did not issue a BATTEST command, this situation can indicate that the ac detection circuit 130 is malfunctioning or that the main power supply 116 is connected to a different standby power supply 136.

Figure 3:
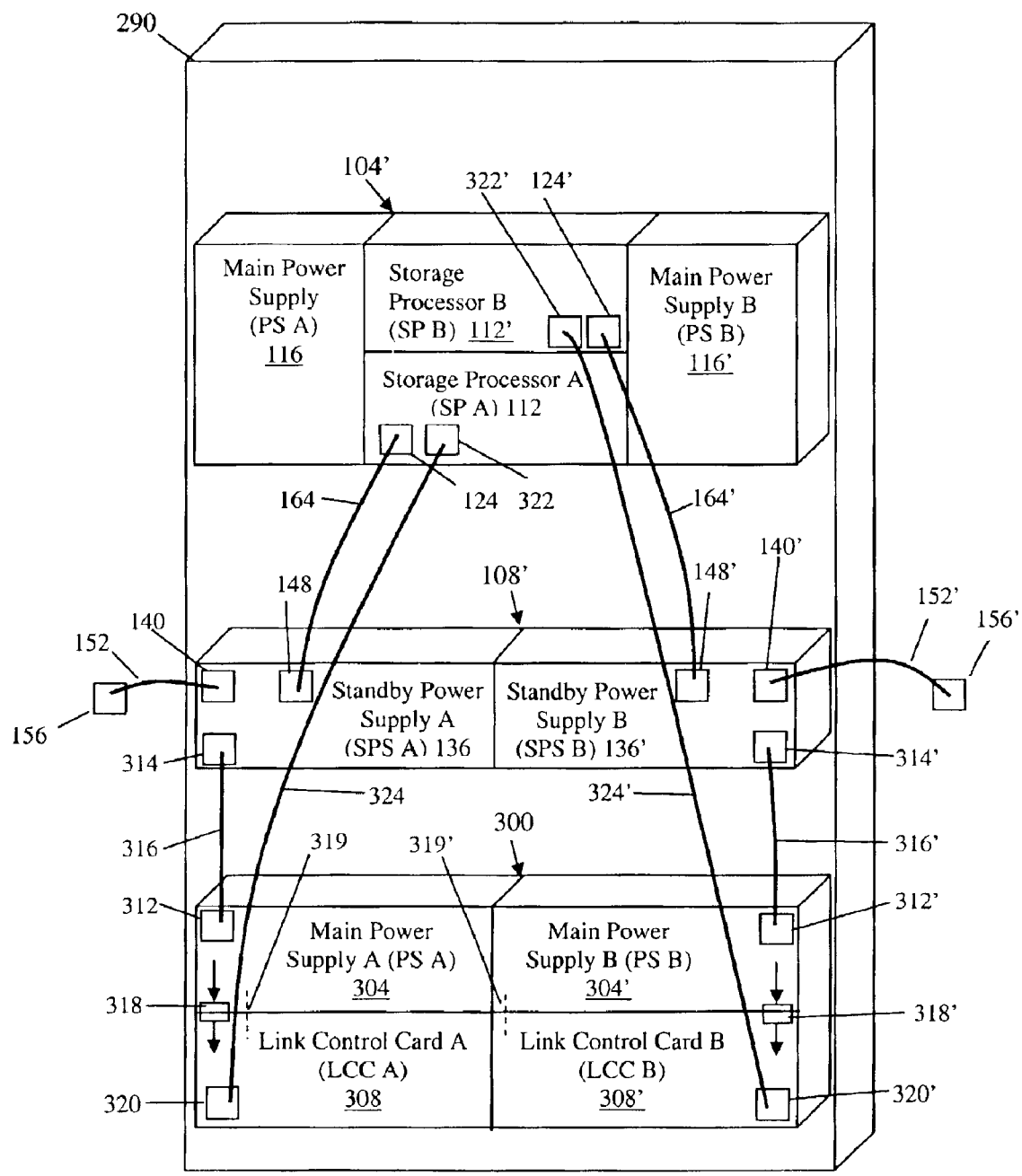
FIG. 3 is a diagram of another embodiment of a data storage system embodying the principles of the invention.

FIG. 3 shows a rear view of another embodiment of a data storage system 290 constructed in accordance with the principles of the invention. The data storage system 290 includes a storage processor enclosure 104', a standby power supply enclosure 108', and a third enclosure 300. The storage processor enclosure 104' and standby power supply enclosure 108' have like structural elements and features as their counterparts in FIG. 1.

The third enclosure 300, called a disk array enclosure, has redundant main power supplies (PS A) 304 and (PS B) 304', redundant link control cards (LCC A) 308 and (LCC B) 308', and a number of disk drives (not shown). Although this embodiment is illustrated through the use of link control cards, it is to be understood that the principles of the invention apply to any enclosure card (or board) which performs a logic or control function and communicates with the storage processor 112. The use of redundancy is also illustrative; the principles of the invention apply to systems that do not employ redundancy.

Each main power supply 304, 304' includes a power inlet 312, 312', respectively, and is capable of operating from either an ac or dc source. The power inlets 312, 312' are each electrically connected to a respective power outlet 314, 314' of the standby power supply 136, 136' by a respective power cord 316, 316' to receive ac or dc power.

Main power supply 304 provides power received from the standby power supply 136 to the link control card 308 and main power supply 304' provides power received from the standby power supply 136' to the link control card 308'. Each main power supply 304, 304' can also communicate with the associated link control card 308, 308' through the use of one or more registers 318, 318', to which the main power supplies 304, 304' write data and from which the link control cards 308, 308' read the data written by the main power supplies 304, 304'. In FIG. 3, the registers 318, 318' are shown to be between the main power supply 304, 304' and link control card 308, 308', signifying the communicative role of the registers. In practice, each registers 318, 318' can either be part of the main power supply 304, 304' or of the link control card 308, 308'. In another embodiment, each main power supply 304, 304' communicates with the respective link control card 308, 308' over one or more dedicated hard-wired connections 319, 319', respectively. Over these hard-wired connections, the main power supplies 304, 304' provide AC_FAIL_N and PS_FLT_N signals (or their equivalents), as described above.

The link control card 308 includes a communications port 320 that is connected to a communications port 322 of the storage processor 112 over a communication path 324. Similarly, the link control card 308' includes a communications port 320' that is connected to a communications port 322' of the storage processor 112' over a communication path 324'. In one embodiment, the communication paths 324, 324' are serial data communication paths and the link control cards 308, 308' communicate with the respective storage processor 112, 112' over these communication paths 324, 324' using the Fibre Channel protocol. In general, the Fibre Channel protocol is a technology for transmitting data between computer devices at a data rate of up to 2 Gbps. The protocol links computer servers to storage devices and storage controllers with storage drives. Protocols or communication means other than the Fibre Channel protocol can be used to practice the principles of the invention.

Figure 4:
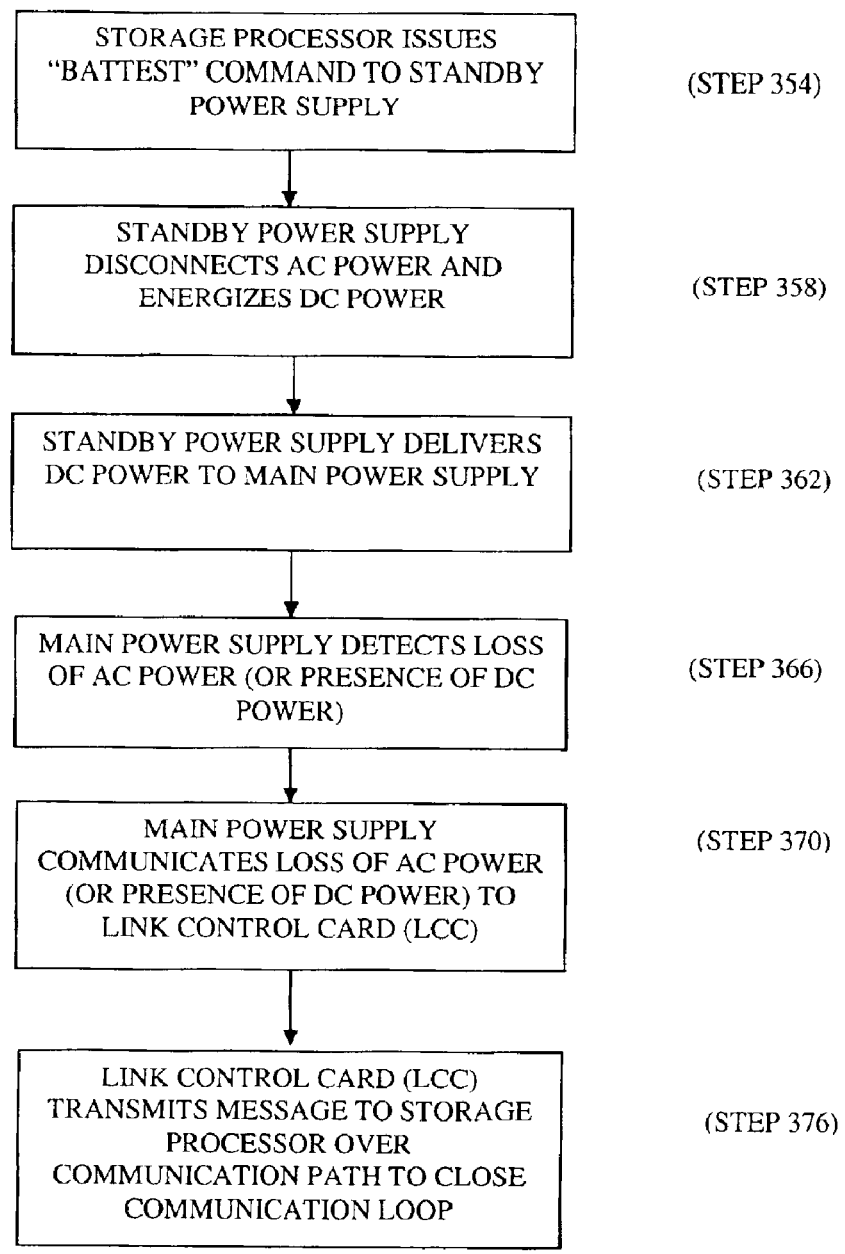
FIG. 4 is a flow diagram of an embodiment of a process for testing the connectivity between a standby power supply and a main power supply in the data storage system of FIG. 3.

FIG. 4 shows an embodiment of a process 350 for testing the connectivity between the standby power supplies 136, 136' and each of the main power supplies 304, 304' of the disk array enclosure 300 in FIG. 3. The process 350 executes upon initial power-up of the data storage system 290 (FIG. 3), before or after execution of the process 200 (FIG. 2), and, in some embodiments, at predetermined intervals thereafter. The process 350 is described with respect to the "A" side of the various enclosures 104', 108', and 300 with the understanding that the "B" side operates similarly.

In step 354, the storage processor 112 issues a command to the standby power supply 136 over the communication path 164 to perform a battery diagnostic test (i.e., switch to supplying dc power). In response to the command, the standby power supply 136 disconnects the ac power to the main power supply 304 and energizes the dc power (step 358). The standby power supply 136 then supplies (step 362) dc power to the main power supply 304 over the power cord 316.

The main power supply 304 detects (step 366) the loss of the ac power or the presence of dc power and, in response, notifies (step 370) the link control card 308. In one embodiment, this notification occurs by the main power supply 304 writing certain data to the register 318 that are read by the link control card 308. In another embodiment, the main power supply 304 notifies the link control card 308 over the dedicated hard-wired connection(s) 319.

Upon reading this data (or receiving a signal over a hard-wired connection 319), the link control card 308 communicates (step 376) with the storage processor 112 over the communication path 324 to inform of the detection of dc power (or of the loss of ac power) by the main power supply 304. The storage processor 112 waits for a predetermined period after issuing the command (e.g., a few seconds) to receive this communication. If the communication does not arrive before the period expires, the storage processor 112 can trigger an alarm to alert an assembler of the system 290 of a missing connection between the standby power supply 136 and the main power supply 304.

Receiving this communication within the predetermined period closes the communication loop that originates and terminates with the storage processor 112 and passes through the standby and main power supplies 136, 304 and link control card 308 over connections 164, 316, and 324. This communication from the link control card 308 signifies that the main power supply 304 is receiving dc power in response to the command that the storage processor 112 sent to the standby power supply 136. Because the main power supply 304 can receive dc power only if connectivity exists between the standby power supply 136 and the main power supply 304, the storage processor 112 can conclude that the main power supply 304 is connected to the standby power supply 136, and therefore available in the event of a failure of the ac utility. Light-emitting diodes located on the rear or front side of the disk array enclosure 300 can be used to indicate a missing or a confirmed connection (e.g., amber or yellow for missing, green for confirmed).

As described above in connection with the FIG. 1 and FIG. 2, the closed-loop communication for testing the connectivity of the main power supply 304 to the standby power supply 136 can also reveal whether the main power supply 304 is receiving dc power from an unexpected source.

Performing steps 354 through 376 of the process 350 using the second storage processor 112' tests the connection between the second main power supply 304' of the disk array enclosure 300 and the second standby power supply 136'. In this instance, the communication loop originates and terminates with the second storage processor 112' and passes through the second standby power supply 136', the second main power supply 304', and the second link control card 308' through connections 164', 316', and 324'.

Figure 5:
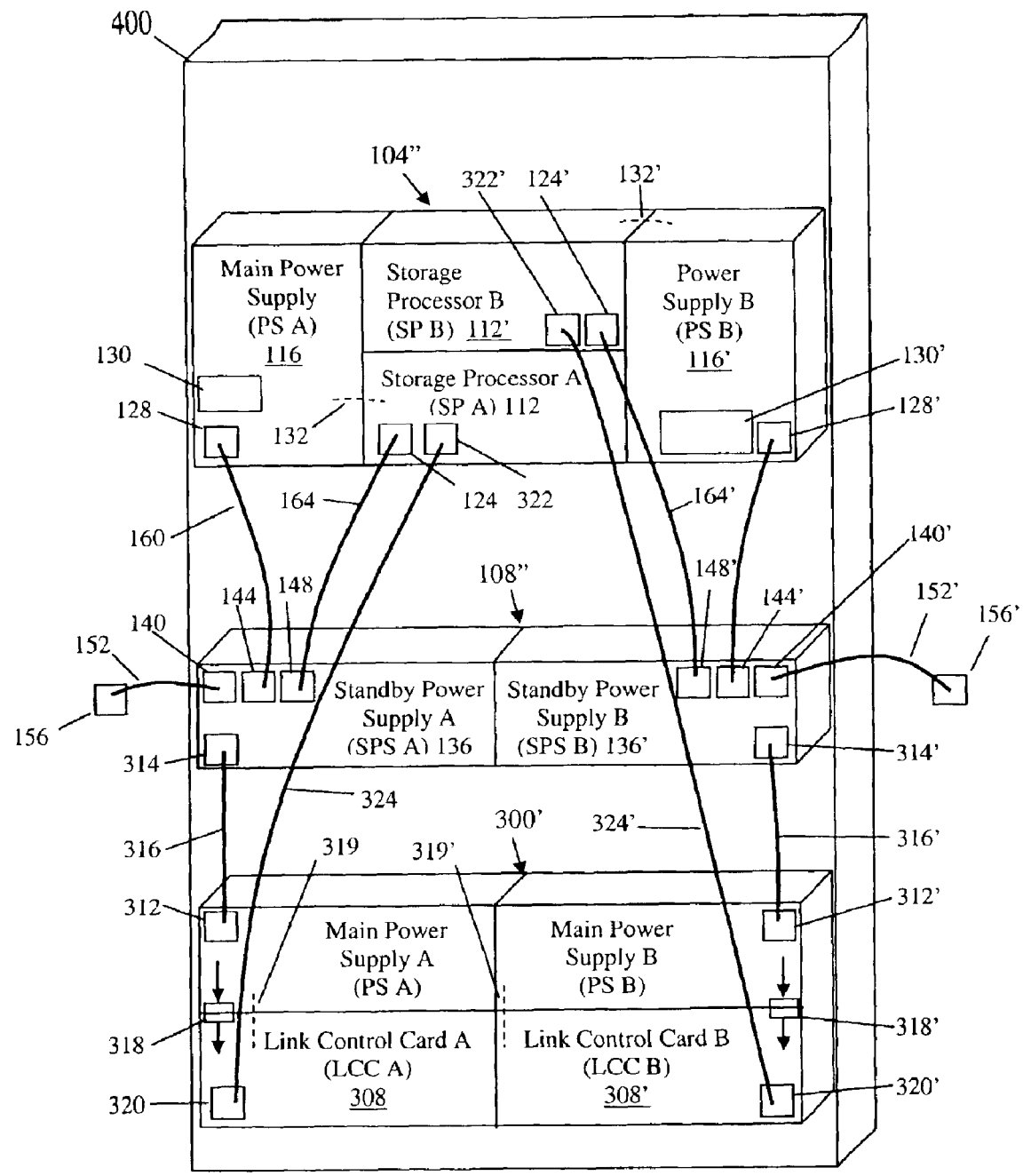
FIG. 5 is an embodiment of a data storage system that combines the embodiments of data storage systems shown in FIG. 1 and FIG. 3.

FIG. 5 shows another embodiment of a data storage system 400 that includes a processor enclosure 104", a standby power enclosure 108", and a disk array enclosure 300'. This embodiment combines the embodiments of FIG. 1 and FIG. 3. Note that each standby power supply 136, 136' has two power outlets: standby power supply 136 has power outlets 144 and 314, and standby power supply 136' has power outlets 144' and 314'.

This embodiment tests the connections (i.e., power cords 160, 160') between the standby power supplies 136, 136' and the appropriate main power supply 116, 116' of the processor enclosure 104" and the connections (i.e., power cords 316, 316) between the standby power supplies 136, 136' and the appropriate main power supply 304, 304' of the disk array enclosure 300'. The process for testing these connections combines the processes 200 and 350 of FIG. 2 and FIG. 4, respectively, in any order. In this combined process, each storage processor 112 confirms two separate signals (an AC_FAIL_N signal from the main power supply 116 and a communication from the card 308).

While the invention has been shown and described with reference to specific preferred embodiments, it should be understood by those skilled in the art that various changes in form and detail may be made therein without departing from the spirit and scope of the invention as defined by the following claims.

What is claimed is:

1. A system, comprising:
   a processor providing a command;
   a first power supply in communication with the processor; and
   a second power supply providing ac power to the first power supply, the second power supply switching from providing ac power to providing dc power to the first power supply in response to the command issued by the processor, the first power supply, in response to a loss of ac power from the second power supply, providing a communication that operates to indicate to the processor that the second power supply is electrically connected to the first power supply for supplying power.

2. The system of claim 1, further comprising an enclosure card in communication between the first power supply and the processor, the enclosure card receiving the communication from the first power supply and communicating with the processor in response to the communication provided by the first power supply.

3. The system of claim 2, wherein the enclosure card communicates with the processor over a serial communication path according to a Fibre Channel protocol.

4. The system of claim 1, further comprising a register for storing data comprising the communication from the first power supply.

5. The system of claim 1, wherein the first power supply includes a detection circuit that provides the communication upon detecting the loss of ac power.

6. The system of claim 1, wherein the first power supply includes a detection circuit that provides the communication upon detecting dc power.

7. The system of claim 1, further comprising a mid-plane having an electrical connection between the first power supply and the processor by which the first power supply provides the communication to the processor.

8. The system of claim 1, wherein the first power supply is capable of operating from either an ac power source or from a dc power source.

9. The system of claim 1, wherein the processor provides the command to the second power supply over a RS-232 connection.

10. The system of claim 1, wherein the communication provided by the first power supply includes a first signal indicating whether the first power supply has detected a loss of ac power and a second signal indicating whether the first power supply is operating normally.

11. The system of claim 10, wherein the first and second signals indicate that the first power supply is receiving dc power from the second power supply when the first signal indicates that the main power supply detected a loss of ac power and the second signal indicates that the first power supply is operating normally.

12. A method of testing connectivity between a main power supply and a standby power supply, the method comprising:
   providing a command from a processor that instructs the standby power supply to switch from supplying ac power to supplying dc power to the main power supply;
   supplying dc power to the main power supply from the standby power supply in response to the command from the processor; and
   generating by the main power supply, in response to a loss of ac power, a communication that operates to indicate to the processor that the standby power supply is electrically connected to the main power supply for supplying power.

13. The method of claim 12, wherein the communication generated by the main power supply includes a signal to the processor that indicates a detection of the loss of ac power.

14. The method of claim 12, further comprising storing data that comprise the communication into a register.

15. The method of claim 12, further comprising detecting a loss of ac power by the main power supply to cause the main power supply to generate the communication.

16. The method of claim 12, further comprising waiting a predetermined period after the processor issues the command for the processor to receive an indication that the standby power supply is electrically connected to the main power supply.

17. The method of claim 16, further comprising altering program execution if the predetermined period elapses without the processor receiving an indication that the standby power supply is connected to the main power supply.

18. A system, comprising:

processing means for issuing a command;

a first power source in electrical communication with the processing means;

a backup power source providing ac power to the first power source, the backup power source switching from providing ac power to providing dc power to the first power source in response to the command; and means for communicating to the processing means that the first power source is operating on dc power in response to the backup power supply switching from providing ac power to providing dc power.

19. The system of claim 18, wherein the means for communicating includes a signal that is provided upon detection of a loss of ac power by the first power source.

20. The system of claim 18, wherein the means for communicating includes an enclosure board receiving a communication from the first power source indicating that the first power source detected a loss of ac power and communicating with the processing means to indicate that the first power source detected a loss of ac power.

* * * * *